(12) United States Patent
Bisaka

(10) Patent No.: US 7,855,026 B2
(45) Date of Patent: Dec. 21, 2010

(54) FUEL CELL STACK

(75) Inventor: Toru Bisaka, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 681 days.

(21) Appl. No.: 11/311,276

(22) Filed: Dec. 20, 2005

(65) Prior Publication Data

US 2006/0093889 A1    May 4, 2006

Related U.S. Application Data

(63) Continuation of application No. PCT/JP2005/005611, filed on Mar. 18, 2005.

(30) Foreign Application Priority Data

Mar. 31, 2004  (JP) .............................. 2004-102984
Mar. 31, 2004  (JP) .............................. 2004-102991

(51) Int. Cl.
- H01M 8/24 (2006.01)
- H01M 2/38 (2006.01)
- H01M 8/04 (2006.01)
- H01M 4/64 (2006.01)

(52) U.S. Cl. ........................ 429/452; 429/457; 429/514; 429/517

(58) Field of Classification Search ................... None
See application file for complete search history.

(56) References Cited

U.S. PATENT DOCUMENTS

| | | | |
|---|---|---|---|
| 4,781,996 A | | 11/1988 | Toriya et al. |
| 6,117,580 A | * | 9/2000 | Nitschke et al. ............... 429/34 |
| 7,132,189 B2 | | 11/2006 | Inai et al. |
| 2003/0180590 A1 | * | 9/2003 | Hase et al. .................... 429/26 |
| 2003/0219644 A1 | | 11/2003 | Inai et al. |

FOREIGN PATENT DOCUMENTS

| | | |
|---|---|---|
| DE | 195 34 047 C1 | 12/1996 |
| DE | 196 81 750 B4 | 8/2005 |
| EP | 0 521 830 A1 | 1/1993 |
| JP | A-62-295356 | 12/1987 |
| JP | A 2-227964 | 9/1990 |
| JP | A-5-325993 | 12/1993 |
| JP | A 8-130028 | 5/1996 |
| JP | A-8-167424 | 6/1996 |

(Continued)

*Primary Examiner*—Dah-Wei D Yuan
*Assistant Examiner*—Adam A Arciero
(74) *Attorney, Agent, or Firm*—Oliff & Berridge, PLC

(57) ABSTRACT

The object of the present invention is to provide a fuel cell stack with improved corrosion resistance of metal separators and reduced cost. To attain this object, the fuel cell stack according to the present invention has a cell stack constituted by stacking a prescribed number of unit cells obtained by sandwiching both surfaces of an electrolyte membrane between an anode and a cathode and sandwiching the outer sides thereof with a pair of metal separators, wherein the metal separator positioned on the plus side of the cell stack is subjected to surface treatment providing for relatively higher corrosion resistance than the metal separator positioned on the minus side of the cell stack. Cost reduction can be realized, while maintaining corrosion resistance comparable with that obtained in the case when all the separators are subjected to the anticorrosive surface treatment to the same degree.

10 Claims, 2 Drawing Sheets

FOREIGN PATENT DOCUMENTS

| | | |
|---|---|---|
| JP | A-8-306380 | 11/1996 |
| JP | A 2000-21418 | 1/2000 |
| JP | A 2000-90954 | 3/2000 |
| JP | A 2000-106197 | 4/2000 |
| JP | A 2000-138067 | 5/2000 |
| JP | A 2000-149977 | 5/2000 |
| JP | A-2001-216978 | 8/2001 |
| JP | A 2001-345109 | 12/2001 |
| JP | A 2002-216806 | 8/2002 |
| JP | A 2002-252022 | 9/2002 |
| JP | A 2002-260708 | 9/2002 |
| JP | A 2003-163026 | 6/2003 |
| JP | A-2003-346869 | 12/2003 |
| JP | A 2004-335254 | 11/2004 |
| JP | A 2005-26180 | 1/2005 |

* cited by examiner

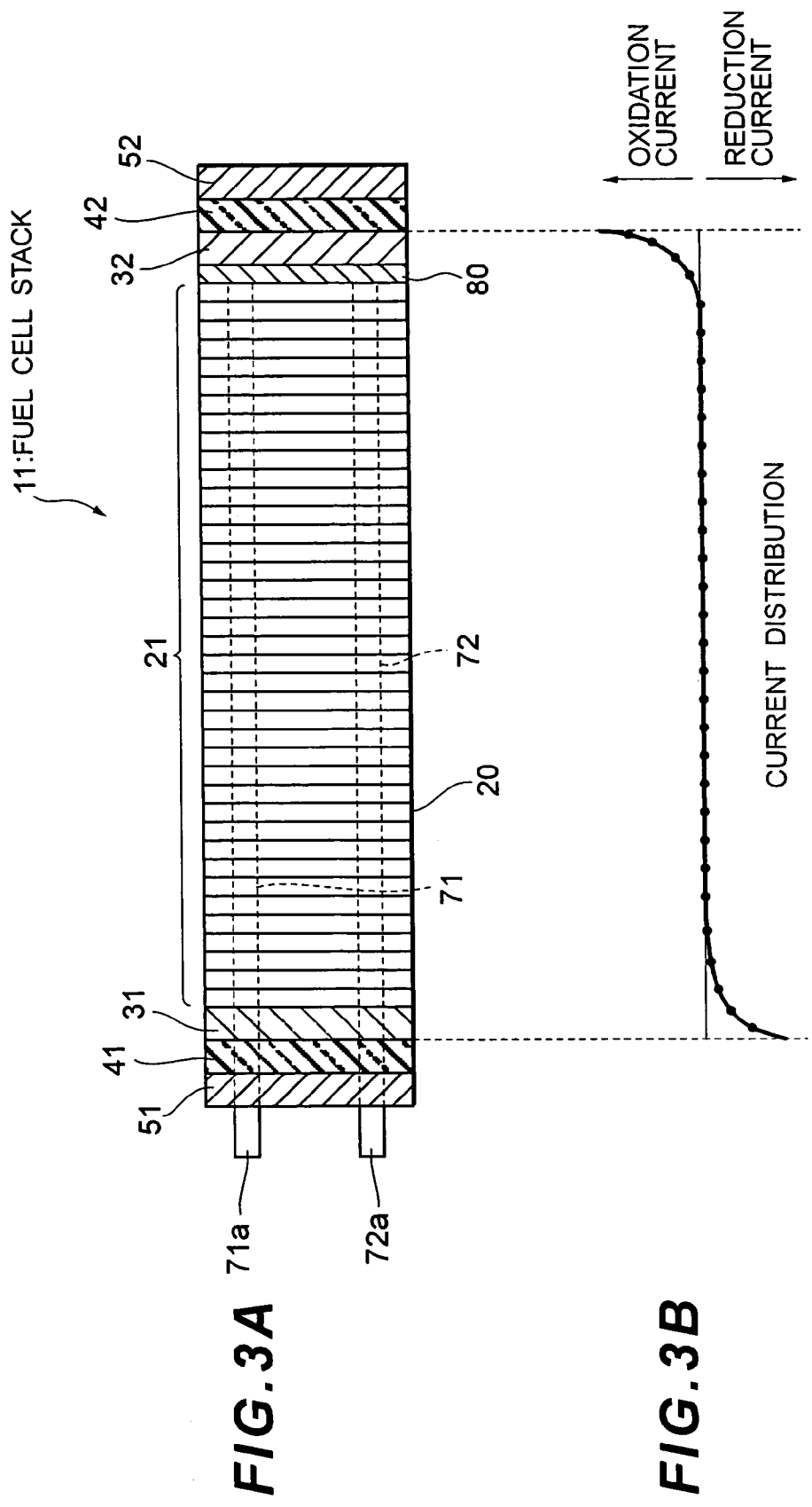

FUEL CELL STACK

This is a Continuation of Application No. PCT/JP2005/005611 filed Mar. 18, 2005, which claims the benefit of Japanese Patent Application No. 2004-102984, Filed Mar. 31, 2004 and Japanese Patent Application No. 2004-102991, filed Mar. 31, 2004. The entire disclosure of the prior applications is hereby incorporated by reference herein in its entirety.

BACKGROUND

The present invention relates to an anticorrosive structure of a fuel cell stack, and more particularly to an improvement technology providing for the increase in corrosion resistance and the reduction of cost of metal separators or terminal plates.

Solid polymer fuel cell stacks have a stack structure constituted by stacking the prescribed number of unit cells in which an anode and a cathode are disposed opposite each other on both surfaces of a solid polymer electrolyte membrane and the outer sides thereof are sandwiched by a pair of separators. When metal separators such as stainless steel separators are used, the metal should be corroded or dissolved in a long-term use, because the metal separators are exposed to corrosive atmosphere at a high temperature. If the metal separators are corroded, the eluted metal ions diffuse into the solid polymer electrolyte membrane and trapped in the ion exchange sites, thereby decreasing the ion conductivity of the solid polymer electrolyte membrane itself. Other consequences include the leak of reaction gases through holes which was formed in the metal separators by corrosion and the leak of coolant caused by erosion of seal lines. In order to avoid those problems, Japanese Patent Laid-open Publication No 2000-21418 suggested a method for surface treating (plating) the conductive separator with a metal layer, for example, a layer of gold or silver, that is inactive in an oxidizing atmosphere.

Furthermore, solid polymer fuel cell stacks have a stack structure constituted by stacking the prescribed number of unit cells in which an anode and a cathode are disposed opposite each other on both surfaces of a solid polymer electrolyte membrane and the outer sides thereof are sandwiched by a pair of separators, and a pair of terminal plates for taking out the power are disposed on both ends of the stack. Because an oxidation current flows in the terminal plate on the plus side, the terminal plate might be corroded if humid gas or coolant comes into contact therewith. Stack structures of various types have been studied with the object of increasing the corrosion resistance of terminal plates. For example, Japanese Patent Laid-open Publication No. 2003-163026 suggested a stack structure in which the terminal plate is prevented from coming into direct contact with humid gases or coolant by using a configuration in which a resin serving as an end plate material is fitted and inserted into a coolant channel of the terminal plate.

However, if all the metal separators constituting a fuel cell stack are surface treated with a noble metal such as gold or silver, the production cost rises.

Furthermore, in the stack structure described in Japanese Patent Laid-open Publication No. 2003-163026, a configuration is employed in which coolant channels pass through the terminal plates on both the plus side and the minus side. Therefore, both terminal plates have to be protected from corrosion and the production cost increases.

SUMMARY

The present invention was created to resolve the above-described problems, and it is an object of the present invention to provide a fuel cell stack comprising an inexpensive stack structure having high corrosion resistance.

It is another object of the present invention to provide a fuel cell stack enabling both the increase in corrosion resistance of the metal separators and the reduction of cost.

It is yet another object of the present invention to provide a fuel cell stack enabling both the increase in corrosion resistance of the terminal plates and the reduction of cost.

In order to attain the above-described objects, the present invention provides a fuel cell stack comprising a cell stack constituted by stacking a plurality of unit cells, the fuel cell stack having a stack structure in which the plus side of the cell stack has corrosion resistance higher than that of the minus side. Increasing the corrosion resistance of the cell stack disposed on the plus side where the oxidation current flows and corrosion advances easier than on the minus side where the reduction current flows makes it possible to provide a fuel cell stack having a stack structure with high corrosion resistance at a cost lower than that required to subject both electrodes to the same corrosion protection.

Here, in the unit cell, both surfaces of an electrolyte membrane are sandwiched between an anode and a cathode and the outer sides thereof are sandwiched with a pair of metal separators, and in the stack structure, the metal separator positioned on the plus side of the cell stack is preferably subjected to surface treatment providing for relatively higher corrosion resistance than the metal separator positioned on the minus side of the cell stack. Such a structure makes it possible to realize cost reduction, while maintaining corrosion resistance comparable with that in the case where all the metal separators are surface treated to the same degree of corrosion resistance.

In the fuel cell system according to the present invention, a plus electrode terminal plate and a minus electrode terminal plate are disposed on respective ends of the cell stack, and in the stack structure, the metal separator positioned on the side of the plus electrode terminal plate is preferably subjected to surface treatment providing for relatively higher corrosion resistance than the metal separator positioned on the side of the minus electrode terminal plate.

Preferably, the anticorrosive surface treatment is carried out on the portions where coolant that cools the cell stack or moisture contained in a reaction gas supplied to the cell stack comes into contact with the metal separator. Because corrosion easily proceeds in the zones that are in contact with moisture, conducting the anticorrosive surface treatment predominantly on the portions that come into contact with the coolant or moisture makes it possible to provide a fuel cell stack having a stack structure with high corrosion resistance at a low cost.

Here, the portion where the coolant comes into contact with the metal separator is, for example, a portion where a coolant manifold is formed, and the portion where the moisture contained in the reaction gas comes into contact with the metal separator is, for example, a portion where a gas channel is formed.

Preferably, the anticorrosive surface treatment is, for example, a plating treatment using a noble metal or a thick-film plating treatment.

Preferably, the anticorrosive surface treatment is conducted to a higher degree on the metal separator positioned on the plus side of the cell stack than on the metal separator positioned on the minus side of the cell stack.

Preferably, the anticorrosive surface treatment is conducted on a metal separator where an oxidation current flows that is equal to or higher than the prescribed threshold. Because corrosion easily advanced where the oxidation current flows, conducting the anticorrosive treatment predominantly on those locations makes it possible to provide a fuel cell stack having a stack structure with high corrosion resistance at a low cost.

In the fuel cell stack according to the present invention, the stack structure may have a configuration comprising a fluid channel that passes inside the cell stack for supplying or releasing a reaction gas or coolant, and the fluid channel may pass only through the terminal plate on the minus side from among a pair of terminal plates disposed at both ends of the cell stack and may be communicated with an inlet port or an outlet port. Because the oxidation current flows in the terminal plate on the plus side, using a configuration in which the coolant or moisture of the reaction gas flowing in the fluid channel does not come into contact with the terminal plate on the plus side makes it possible to increase corrosion resistance of the terminal plate. Furthermore, because the terminal plate on the plus side where the oxidation current flow is protected from corrosion to a higher level than the terminal plate on the minus side where the reduction current flows, the cost is lower than that in the case of equal corrosion protection of the two electrodes.

Here, a shielding plate for blocking the permeation of moisture is preferably disposed between the cell stack and the terminal plate of a plus electrode from among the pair of terminal plates. Inhibiting the contact of moisture with the terminal plate on the plus side, where the oxidation current flows, to a level higher than that of the terminal plate on the minus side, where the reduction current flows, enables both the increase in corrosion resistance and the reduction of cost.

DESCRIPTION OF DRAWINGS

FIG. 2 is an explanatory drawing of a metal separator of mode 1 for carrying out the invention and FIG. 3A and FIG. 3B are an explanatory drawing of a fuel cell stack of mode 2 for carrying out the invention.

DETAILED DESCRIPTION

Mode 1 for Carrying Out the Invention

In a fuel cell stack of the present mode for carrying out the invention, a metal separator positioned on the plus side of a cell stack is subjected to surface treatment providing it with corrosion resistance higher than that of a metal separator positioned on the minus side of the cell stack. An oxidation electric current flows in a coolant channel of several metal separators inserted at the plus side end of the cell stack and the oxidation current rapidly increases locally in the plus side end. Because electric corrosion of metal separator easily occurs only at the plus side end of the cell stack, measures aimed at corrosion protection of the metal separator have to be mainly focused on the plus side end. Subjecting a metal separator positioned on the plus side of a cell stack to surface treatment providing it with corrosion resistance higher than that of a metal separator positioned on the minus side of the cell stack makes it possible to realize cost reduction, while maintaining corrosion resistance comparable with that in the case where all the metal separators are surface treated to the same degree of corrosion resistance.

Embodiment 1

Figure 1A:
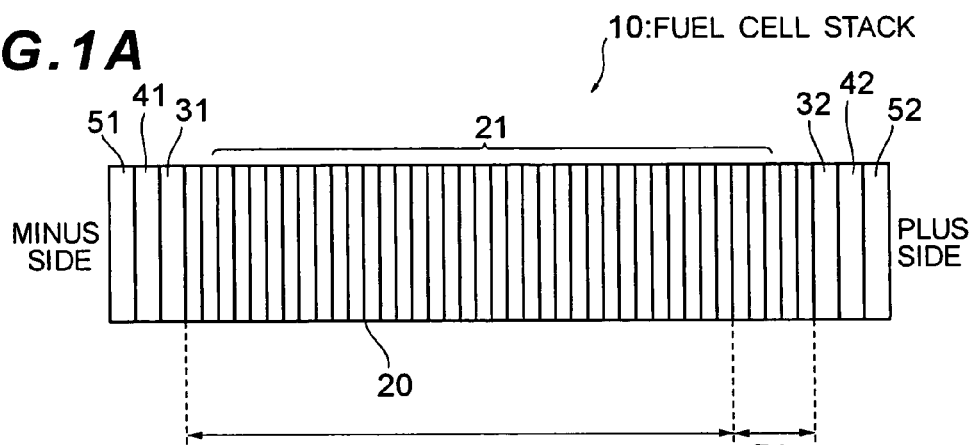
FIG. 1A and FIG. 1B are an explanatory drawing of a fuel cell stack of mode 1 for carrying out the invention.
Figure 1B:
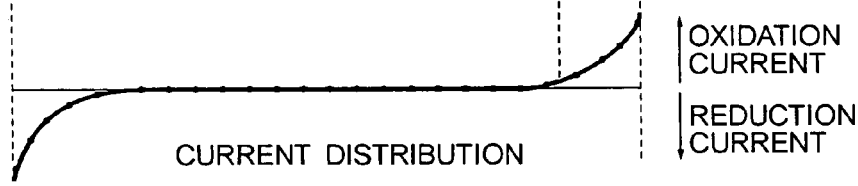

FIG. 1 is an explanatory drawing of a fuel cell stack 10 of Embodiment 1. As shown in FIG. 1 A, the fuel cell stack 10 has a cell stack 21 constituted by stacking in serial the prescribed number of unit cells 20 in which both surfaces of an electrolyte membrane are sandwiched between an anode and a cathode and the anode and cathode are sandwiched between a pair of metal separators. A pair of terminal plates 31, 32 for taking out the power are arranged at both ends of the cell stack 21. The outer sides of the terminal plates 31, 32 are sandwiched by a pair of end plates 51, 52 via insulating plates 41, 42. An oxidation electric current (see FIG. 1B) flows locally in the plus side end section in a coolant channel (not shown in the figure) passing through inside the cell stack 21. The oxidation current increases rapidly in the plus side end of the cell stack 21. A metal separator subjected to anticorrosive surface treatment is inserted in the zone PA of the cell stack 21 where the oxidation current flows that is equal to or higher than the prescribed threshold, and a metal separator that is not subjected to anticorrosive surface treatment is inserted in the zone PB where the oxidation electric current flows that is less than the threshold. The threshold is preferably set to a current value suitable from the standpoint of both increasing the corrosion resistance of metal separator and reducing the cost. Because the oxidation current flows locally only in part of the cell stack 21, a metal separator subjected to anticorrosive surface treatment may be inserted at least in the zone where the oxidation current, even if a small one, flows.

Figure 2:
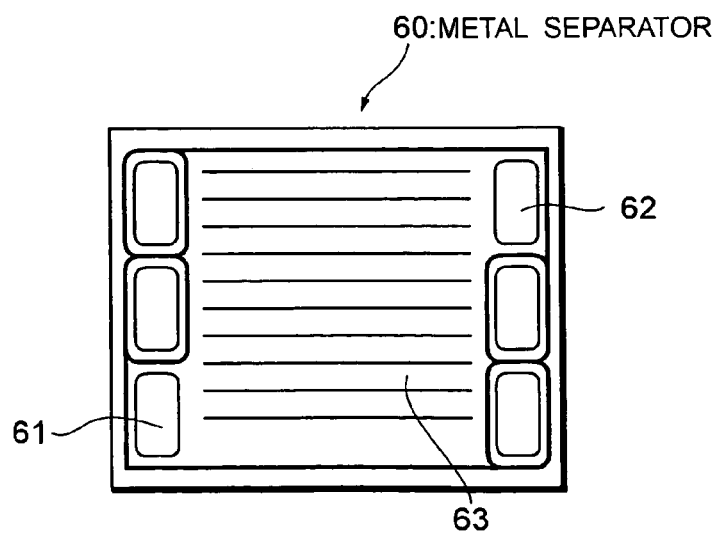

FIG. 2 is a plan view of the metal separator 60. It is preferred that zones that will be in contact with moisture be the portions subjected to the anticorrosive surface treatment. For example, the anticorrosive surface treatment may be conducted on such portions as the coolant inlet manifold 61, a coolant outlet manifold 62, and a cooling surface 63. Moisture that is in contact with the metal separator 60 is not only the coolant for cooling the unit cell 20, but also includes a generated water that is produced by reaction gases (fuel gas, oxidizing gas) supplied to the unit cell 20 when they participate in the cell reaction, or water of condensation that is produced, e.g., by condensation. Therefore, it is preferred that the anticorrosive surface treatment be also conducted on an inlet manifold, an outlet manifold, and a gas channel for reaction gases. Furthermore, surface treatment providing for high corrosion resistance may be conducted on the zone of the metal separator 60 that will be in contact with water and surface treatment providing for low corrosion resistance may be conducted on the zone that will not be in contact with water. Examples of the surface treatment providing for high corrosion resistance include plating using noble metals such as gold and silver and thick-film plating. Thin-film plating is an example of surface treatment providing for low corrosion resistance.

According to the present embodiment, the metal separator 60 subjected to anticorrosive surface treatment is inserted only into a zone PA where an oxidation current flows that is equal to or higher than the threshold. Therefore, cost reduction can be realized, while maintaining corrosion resistance comparable with that attained when the anticorrosive surface treatment is conducted on all the metal separators 60 constituting the cell stack 21.

Embodiment 2

In the present embodiment, metal separators 60 subjected to surface treatment providing for high corrosion resistance are inserted into zone PA where an oxidation current flows that is equal to or higher than the threshold, and metal separators 60 subjected to surface treatment providing for low corrosion resistance are inserted into zone PB where an oxidation current flows that is lower than the threshold. The degree of corrosion resistance provided by the surface treatment conducted on the metal separators 60 inserted in identical zone PA (or regions PB) may be the same, but the degree of corrosion resistance may also gradually increase from the minus side to the plus side of the cell stack 21.

According to the present embodiment, the degree of corrosion resistance provided by the surface treatment conducted on the metal separators 60 varies according to the position (or amount of oxidation current) in the cell stack 21. Therefore, cost reduction can be realized, while maintaining corrosion resistance comparable with that attained when the anticorrosive surface treatment is conducted on all the metal separators 60 constituting the cell stack 21.

Mode 2 for Carrying Out the Invention

FIG. 1 is an explanatory drawing of a fuel cell stack of this mode for carrying out the invention. As shown in FIG. 1A, the fuel cell stack 11 has a cell stack 21 constituted by stacking a plurality of unit cells 20 in which an electrolyte membrane is sandwiched between a pair of electrodes and the electrodes are sandwiched between a pair of conductive separators. A fluid supply channel 71 for supplying reaction gases (fuel gas, oxidation gas) or coolant to the unit cells 20 and a fluid release channel 72 for releasing the reaction gases that were supplied to the cell reaction of unit cells or the coolant that participated in heat exchange with the unit cells 20 are provided through inside the cell stack 21. A pair of terminal plates 31, 32 for taking out the power are arranged at both ends of the cell stack 21. The outer sides of the terminal plates 31, 32 are sandwiched by a pair of end plates 51, 52 via insulating plates 41, 42. An inlet port 71a to the fluid supply channel 71 and an outlet port 72a from the fluid release channel 72 are formed in the end plate 51 on the minus side of the fuel cell stack 10.

The reaction gas supply channel and coolant supply channel, and the reaction gas release channel and coolant release channel are respectively different fluid channels, but for the sake of convenience the former will be called together a fluid supply channel 71 and the latter will be called together a fluid release channel 72. Furthermore, when it is not necessary to distinguish between the fluid supply channel 71 and fluid release channel 72, they will be simply called fluid channels 71, 72.

A configuration may be used in which of a pair of terminal plates 31, 32, the fluid channels 71, 72 pass through only the terminal plate 31 on the minus side and are communicated with the inlet port 71a and outlet port 72a and no inlet port or outlet port of the fluid channels 71, 72 are formed in the terminal plate 32 on the plus side. With such a configuration, the coolant flowing through the fluid channels 71, 72 or moisture present in the reaction gas that was generated, e.g., by the cell reaction is prevented from coming into contact with the terminal plate 32 of the plus electrode. In order to inhibit the contact of moisture with the terminal plate 32 even more effectively, a shielding plate 80 that blocks the permeation of moisture is preferably disposed between the terminal plate 32 and cell stack 21. No specific limitation is placed on the shielding plate 80, provided that it ensures electric connection between the cell stack 21 and terminal plate 32 and blocks the permeation of moisture. For example, a conductive plate is preferably used as the shielding plate.

As shown in FIG. 1B, a reduction current locally flows in the terminal plate 31 of the minus electrode and in the unit cell 20 in the vicinity thereof, whereas an oxidation current locally flows in the terminal plate 32 of the plus electrode and in the unit cell 20 in the vicinity thereof. Because corrosion can easily advance if moisture comes into contact with the terminal plate 32 of the plus electrode where a large oxidation current flow, when the terminal plates 31, 32 are protected from corrosion, main attention should be paid to the plus side. Paying major attention to corrosion protection of the plus side, which is easier corroded, rather than taking identical anticorrosive measures with respect to both electrodes (plus side and minus side) of the fuel cell stack 10, with the above-described configuration makes it possible to increase corrosion resistance of the terminal plates and reduce cost.

According to the present invention, cost reduction can be realized, while maintaining corrosion resistance comparable with that attained when the anticorrosive surface treatment is conducted on all the metal separators.

According to the present invention, employing a configuration in which the coolant flowing in the fluid channels or moisture of the reaction gas are prevented from coming into contact with the terminal plate on the plus side enables both the improvement of corrosion resistance of the terminal plate and the reduction of cost.

I claim:

1. A fuel cell stack comprising a cell stack constituted by a plurality of unit cells stacked together, said cell stack having a stack structure including two opposite sides, including a plus side and a minus side, the plus side including a first plurality of unit cells that comprise a whole plus side of the cell stack and the minus side including a second plurality of unit cells that comprise a whole minus side of the cell stack, the plus side of the cell stack having corrosion resistance higher than that of the minus side of the cell stack when viewed from a viewpoint of the whole cell stack, the plus side of the cell stack corresponding to a first zone of the cell stack where oxidation current occurs, the minus side of the cell stack corresponding to a second zone of the cell stack where no oxidation current occurs, wherein each unit cell has a separator on each end and at least one separator in at least one unit cell in the first zone of the cell stack has a corrosion resistance that is higher than a corrosion resistance of both of the separators for each unit cell in the second zone of the cell stack.

2. The fuel cell stack according to claim 1, wherein each unit cell comprises an electrolyte membrane, an anode and a cathode sandwiching both surfaces of the electrolyte membrane, and the separators for each unit cell are metal separators that sandwich the anode and the cathode, and the metal separator positioned on the plus side of said cell stack is subjected to surface treatment providing for relatively higher corrosion resistance than the metal separator positioned on the minus side of said cell stack in said stack structure, and the metal separator positioned on the plus side of said cell stack has a higher corrosion resistance than the metal separator positioned on the minus side of said cell stack in said stack structure.

3. The fuel cell stack according to claim 2, wherein a plus electrode terminal plate and a minus electrode terminal plate are arranged on respective ends of said cell stack, and in said stack structure, the metal separator positioned on the side of the plus electrode terminal plate is subjected to surface treatment providing for relatively higher corrosion resistance than the metal separator positioned on the side of the minus electrode terminal plate.

4. The fuel cell stack according to claim 2, wherein said surface treatment providing for corrosion resistance is carried out on the portions where coolant that cools said cell stack or moisture contained in a reaction gas supplied to said cell stack comes into contact with said metal separator.

5. The fuel cell stack according to claim 4, wherein the portion where said coolant comes into contact with said metal separator is a portion where a coolant manifold is formed, and the portion where the moisture contained in said reaction gas comes into contact with said metal separator is a portion where a gas channel is formed.

6. The fuel cell stack according to claim 2, wherein said surface treatment providing for corrosion resistance is a plating treatment using a noble metal or a thick-film plating treatment.

7. The fuel cell stack according to claim 2, wherein the amount of said surface treatment providing for corrosion resistance gradually increases in the direction from the metal separator positioned on the minus side of said cell stack to the metal separator positioned on the plus side of said cell stack.

8. The fuel cell stack according to claim 2, wherein said surface treatment providing for corrosion resistance is conducted on the metal separator where an oxidation current equal to or higher than a prescribed threshold flows.

9. The fuel cell stack according to claim 1, wherein said stack structure comprises a fluid channel that passes inside said cell stack for supplying or releasing a reaction gas or coolant, and said fluid channel passes only through a terminal plate on the minus side from among a pair of terminal plates disposed at both ends of said cell stack and is communicated with an inlet port or an outlet port.

10. The fuel cell stack according to claim 9, wherein a shielding plate for blocking the permeation of moisture is disposed between said cell stack and the terminal plate of a plus electrode from among said pair of terminal plates.

* * * * *